US011099942B2

(12) United States Patent
Doster et al.

(10) Patent No.: US 11,099,942 B2
(45) Date of Patent: Aug. 24, 2021

(54) ARCHIVAL TO CLOUD STORAGE WHILE PERFORMING REMOTE BACKUP OF DATA

(71) Applicant: INTERNATIONAL BUSINESS MACHINES CORPORATION, Armonk, NY (US)

(72) Inventors: Bard A. Doster, Tuscon, AZ (US); Nadim P. Shehab, Tucson, AZ (US); Corey G. Smeaton, Chelmsford, MA (US); Max D. Smith, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 243 days.

(21) Appl. No.: 16/360,928

(22) Filed: Mar. 21, 2019

(65) Prior Publication Data
US 2020/0301785 A1    Sep. 24, 2020

(51) Int. Cl.
*G06F 12/00* (2006.01)
*G06F 11/14* (2006.01)
*G06F 16/27* (2019.01)

(52) U.S. Cl.
CPC ........ *G06F 11/1461* (2013.01); *G06F 16/273* (2019.01); *G06F 2201/84* (2013.01)

(58) Field of Classification Search
CPC . G06F 11/1461; G06F 16/273; G06F 2201/84
See application file for complete search history.

(56) References Cited

U.S. PATENT DOCUMENTS

| | | | |
|---|---|---|---|
| 7,277,997 B2 | 10/2007 | Vincent | |
| 7,603,581 B2 * | 10/2009 | Boyd | G06F 11/2058 |
| | | | 714/13 |
| 7,627,729 B2 | 12/2009 | Bartfai et al. | |
| 8,538,928 B2 | 9/2013 | Thompson et al. | |
| 8,788,768 B2 | 7/2014 | Clayton et al. | |
| 9,112,887 B2 | 8/2015 | Bandyopadhyay et al. | |
| 9,720,786 B2 * | 8/2017 | Crockett | G06F 11/2074 |
| 9,891,851 B2 | 2/2018 | Brown et al. | |
| 10,459,806 B1 * | 10/2019 | He | G06F 11/1464 |
| 2010/0122184 A1 * | 5/2010 | Vonog | G06F 3/0486 |
| | | | 715/753 |
| 2011/0179415 A1 * | 7/2011 | Donnellan | G06F 9/45558 |
| | | | 718/1 |
| 2014/0075021 A1 * | 3/2014 | Revanuru | H04L 43/04 |
| | | | 709/224 |

(Continued)

OTHER PUBLICATIONS

U.S. Appl. No. 15/997,466, filed Jun. 4, 2018.

*Primary Examiner* — John A Lane
(74) *Attorney, Agent, or Firm* — Konrad Raynes Davda & Victor LLP; Rabindranath Dutta (57) ABSTRACT

An asynchronous remote copy relationship is maintained between primary storage volumes of a primary storage controller and secondary storage volumes of a secondary storage controller. A command is initiated to generate a point in time copy of a source volume of the primary storage controller to a target volume of the primary storage controller. A mirroring is performed of results of the point in time copy to the secondary storage controller to generate a source volume and a target volume in the secondary storage controller. Data from the target volume in the secondary storage controller is archived to a cloud storage.

12 Claims, 9 Drawing Sheets

(56) References Cited

U.S. PATENT DOCUMENTS

| | | | |
|---|---|---|---|
| 2014/0351214 A1* | 11/2014 | Abercrombie | G06F 16/137 707/626 |
| 2015/0378832 A1* | 12/2015 | Brown | G06F 11/2058 714/19 |
| 2016/0048408 A1* | 2/2016 | Madhu | G06F 11/2023 718/1 |
| 2016/0261693 A1 | 9/2016 | Jing et al. | |
| 2017/0262350 A1* | 9/2017 | Dornemann | G06F 11/1658 |
| 2018/0136858 A1* | 5/2018 | Figueroa | G06F 3/0619 |
| 2018/0260583 A1* | 9/2018 | Doerner | H04L 9/0894 |
| 2018/0349042 A1* | 12/2018 | Brown | G06F 3/067 |
| 2019/0034286 A1* | 1/2019 | Brown | G06F 3/065 |
| 2020/0125412 A1* | 4/2020 | Singh | G06F 3/0647 |
| 2020/0301785 A1* | 9/2020 | Doster | G06F 16/273 |
| 2020/0327016 A1* | 10/2020 | Kumarasamy | G06F 11/1451 |

\* cited by examiner

ARCHIVAL TO CLOUD STORAGE WHILE PERFORMING REMOTE BACKUP OF DATA

BACKGROUND

1. Field

Embodiments relate to archival to cloud storage while performing remote backup of data.

2. Background

Cloud storage is a model of data storage in which digital data is stored in logical pools, and the physical storage spans a plurality of servers. The physical storage environment may be owned and managed by a hosting company referred to as a cloud storage provider. These cloud storage providers may be responsible for keeping the data available and accessible, and for keeping the physical environment protected and maintained properly. People and organizations may buy or lease storage capacity from the cloud storage providers to store user, organization, or application data.

In certain storage system environments, a storage controller may comprise a plurality of storage servers that are coupled to each other, where one or more of the storage servers may comprise a plurality of processing nodes or servers. The storage controller allows host computing systems to perform input/output (I/O) operations with a plurality of storage devices controlled by the storage controller. A storage management application that executes in the storage controller may manage the plurality of storage devices, where the plurality of storage devices may comprise disk drives, tape drives, flash drives, direct access storage devices (DASD), etc. A host computational device may send Input/Output (I/O) commands to the storage controller and the storage controller may execute the I/O commands to read data from the storage devices or write data to the storage devices. In certain situations, the storage controller may also store and maintain certain data in a cloud storage, in addition to storing data in the plurality of storage devices controlled by the storage controller.

Storage controllers, particularly at the enterprise level, are usually designed to provide a high level of redundancy to reduce the risk of data loss in the event of failure of a component. Thus, multiple copies of data are frequently stored by multiple storage controllers, which may be geographically dispersed. Data from a host computational device to be stored by the storage controller is typically directed to a primary storage controller at a local site and then replicated (i.e., copied) to a secondary storage controller, which may be geographically remote from the primary storage controller.

The process of replicating, that is, copying data over to the secondary storage controller may be set up in either as a synchronous replication or an asynchronous replication between the primary storage controller and the secondary storage controller. In a synchronous replication, any updates to the primary storage controller are typically synchronized with the secondary storage controller. In a synchronous replication the data is successfully copied over to the secondary storage controller, before the primary storage controller reports to the host computational device that the data storage I/O operation has been successfully completed.

Some storage systems employ asynchronous replication between a primary storage controller and a secondary storage controller, particularly if the secondary storage controller is geographically distant from the primary storage controller. In an asynchronous replication, successful updates to the primary storage controller are typically reported to the host computational device as a successful storage I/O operation without waiting for the update to be replicated to the secondary storage controller. As a result, the host computational device need not wait for the data replication to the secondary storage controller to be completed, and the performance of the host computational device may be enhanced accordingly.

As the name suggests, in an asynchronous replication, the primary storage controller and the secondary storage controller may not be fully synchronized at any one time. Thus, data stored on the secondary storage controller typically lags that stored in the primary storage controller. Accordingly, new data stored on a primary storage controller may not be stored on the secondary storage controller for an interval of time.

In data replication systems, data is typically maintained in volume pairs, comprising a primary volume in a primary storage device and a corresponding secondary volume in a secondary storage device that includes an identical copy of the data maintained in the primary volume. The primary and secondary volumes are identified by a copy relationship in which the data of the primary volume is copied to the secondary volume. Primary and secondary storage controllers may be used to control access to the primary and secondary storage devices.

Point in time copy is a replication mechanism that allows creation of instantaneous, point in time snapshot copies of entire logical storage volumes or data sets. A point in time copy may involve physically copying all the data from source volumes to target volumes so that the target volumes have a copy of the data as of a point in time. A point in time copy can also be made by logically making a copy of the data and then only copying data over when necessary. FLASHCOPY* (also referred to as FlashCopy) is a type of point in time copy in which nearly instantaneous point in time snapshot copies of entire logical volumes or data sets may be created.

Asynchronous remote copy is a mechanism that provides data replication over extended distances between two sites for business continuity, disaster recovery, and for other reasons. Asynchronous remote copy replicates the data asynchronously from a local site (e.g., a primary location) to a remote site. XRC* (extended remote copy) is a type of asynchronous remote copy mechanism.

SUMMARY OF THE PREFERRED EMBODIMENTS

Provided a method, system, and computer program product in which an asynchronous remote copy relationship is maintained between primary storage volumes of a primary storage controller and secondary storage volumes of a secondary storage controller. A command is initiated to generate a point in time copy of a source volume of the primary storage controller to a target volume of the primary storage controller. A mirroring is performed of results of the point in time copy to the secondary storage controller to generate a source volume and a target volume in the secondary storage controller. Data from the target volume in the secondary storage controller is archived to a cloud storage.

In further embodiments, the command to generate the point in time copy of the source volume of the primary storage controller to the target volume of the primary storage controller is generated by a primary host computational device coupled to the primary storage controller, and sent by the primary host computational device to the primary storage controller.

In yet further embodiments, the mirroring of the results of the point in time copy to the secondary storage controller is initiated by the primary host computational device by sending a remote pair point in time copy command to a secondary host computational device.

In additional embodiments, the remote pair point in time copy command includes a flag that indicates that archiving of data to the cloud storage is to be performed from the target volume in the secondary storage controller.

In certain embodiments, the primary storage controller is coupled to a primary host computational device at a primary subsystem, wherein the secondary storage controller is coupled to a secondary host computational device at a secondary subsystem, and wherein the primary host computational device continues to write additional data to the primary storage controller while storing the data from the target volume in the secondary storage controller to the cloud storage.

In additional embodiments, the data is archived to the cloud storage from the secondary subsystem while maintaining data integrity at the primary subsystem.

In yet additional embodiments, bandwidth usage decreases at the primary subsystem by offloading archiving of data to the cloud storage to the secondary subsystem.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Archiving a dataset to a cloud storage from a storage controller in a primary storage subsystem may require that until the archiving is complete there is a limitation on the ability to update the dataset. In certain embodiments, by using a remote storage subsystem combined with FlashCopy (i.e., point in time copy) technology, users may archive datasets periodically. Such embodiments archive data to cloud storage from a remote storage subsystem while maintaining data integrity and decreasing bandwidth usage at primary storage subsystem. As a result, the operations of one of more computational devices in a storage system environment are improved.

Exemplary Embodiments

Figure 1:
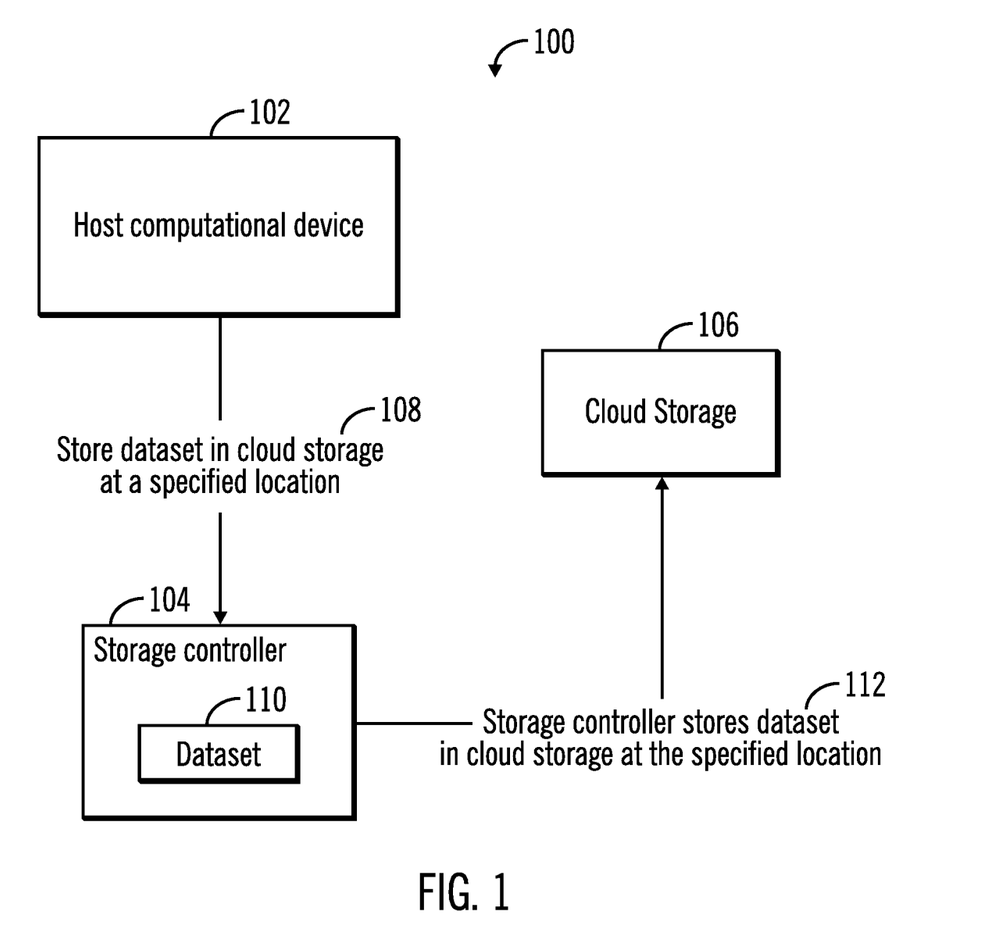
FIG. 1 illustrates a block diagram of a computing environment comprising a host computational device and a storage controller to store data in cloud storage, in accordance with certain embodiments.

FIG. 1 illustrates a block diagram of a computing environment 100 comprising a host computational device 102 and a storage controller 104 to store data in cloud storage 106, in accordance with certain embodiments.

The host computational device 102 transmits a request 108 to the storage controller 104 to store a dataset 110 in the cloud storage 106. In response to receiving the request, the storage controller 104 stores (reference numeral 112) the dataset 110 in the cloud storage 106. The dataset 110 is thus archived in the cloud storage 106.

While the dataset 110 is being archived in the cloud storage, the dataset 110 is difficult to update without suspending or queuing certain operations. Furthermore, the storage controller 104 is additionally burdened with the tasks for archiving the dataset 110 to the cloud storage 106, while the storage controller 104 may have more important tasks (e.g., provide support for I/O operations) to perform.

Figure 2:
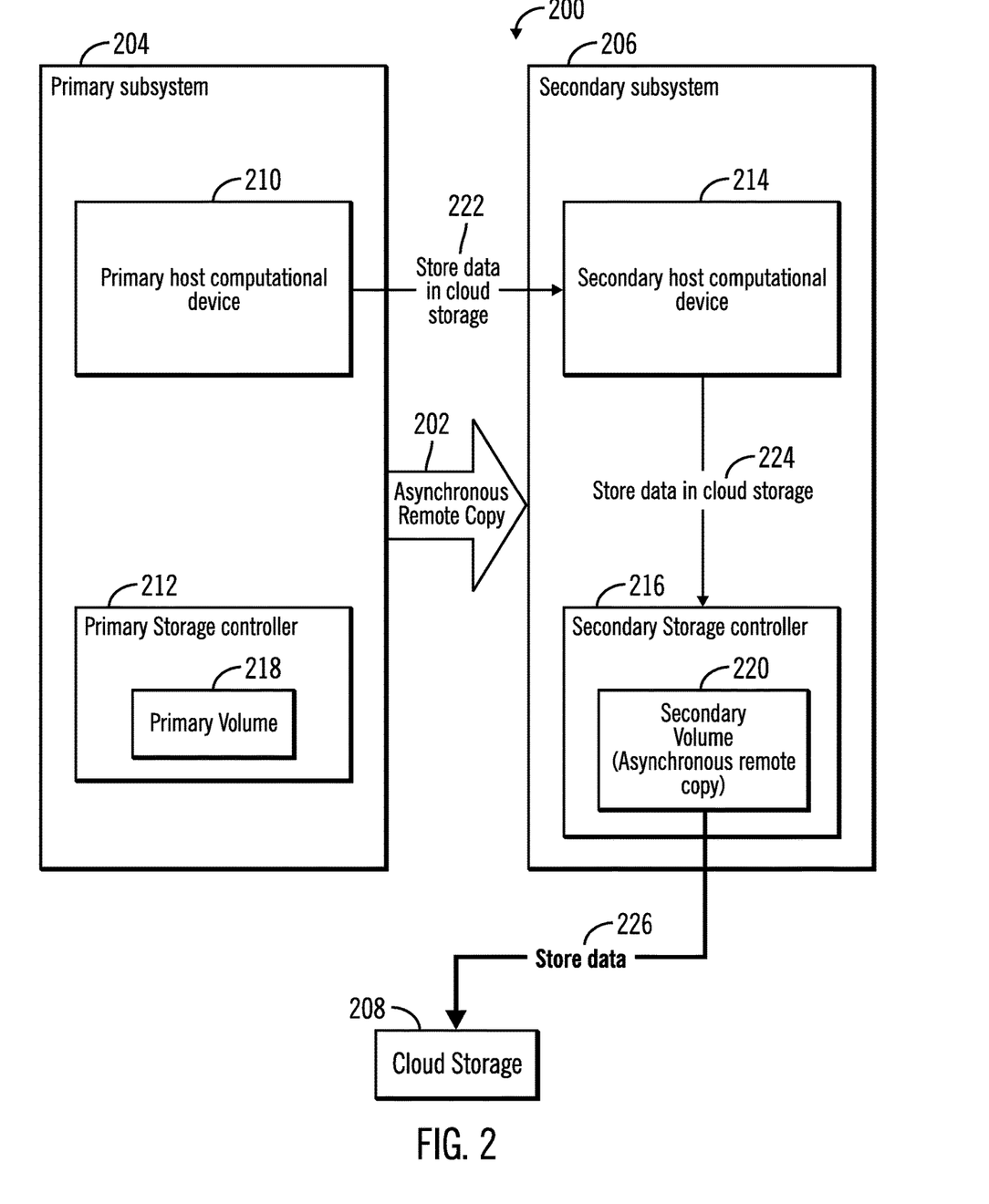
FIG. 2 illustrates a block diagram of a computing environment in which an asynchronous remote copy relationship is maintained between a primary subsystem and a secondary subsystem, and operations for storing of data in cloud storage is offloaded to the secondary subsystem, in accordance with certain embodiments.

FIG. 2 illustrates a block diagram of a computing environment 200 in which an asynchronous remote copy relationship 202 is maintained between a primary subsystem 204 and a secondary subsystem 206, and operations for storing of data in cloud storage 208 is offloaded to the secondary subsystem 206, in accordance with certain embodiments.

The primary subsystem 204 is comprised of a primary host computational device 210 and a primary storage controller 212. The secondary subsystem 206 is comprised of a secondary host computational device 214 and a secondary storage controller 216. A primary volume 218 of the primary storage controller 212 is copied to the secondary volume 220 of the secondary storage controller 216 via the asynchronous remote copy operations.

The primary host computational device 210 sends a request to the secondary host computational device 214 to store data in cloud storage (as shown via reference numeral 222). The secondary host computational device 214 forwards the request to the secondary storage controller 216 (as shown via reference numeral 224). The secondary storage controller 216 stores the data from the secondary volume 220 to the cloud storage 208 (as shown via reference numeral 226).

While the embodiments shown in FIG. 2 helps to reduce system resources at the primary subsystem 204 by offloading tasks for archiving to cloud storage to the secondary subsystem 206, they do not prevent corruption of the archived data to the cloud storage if updates take place to the primary volume 218 during the asynchronous remote copy.

Figure 3:
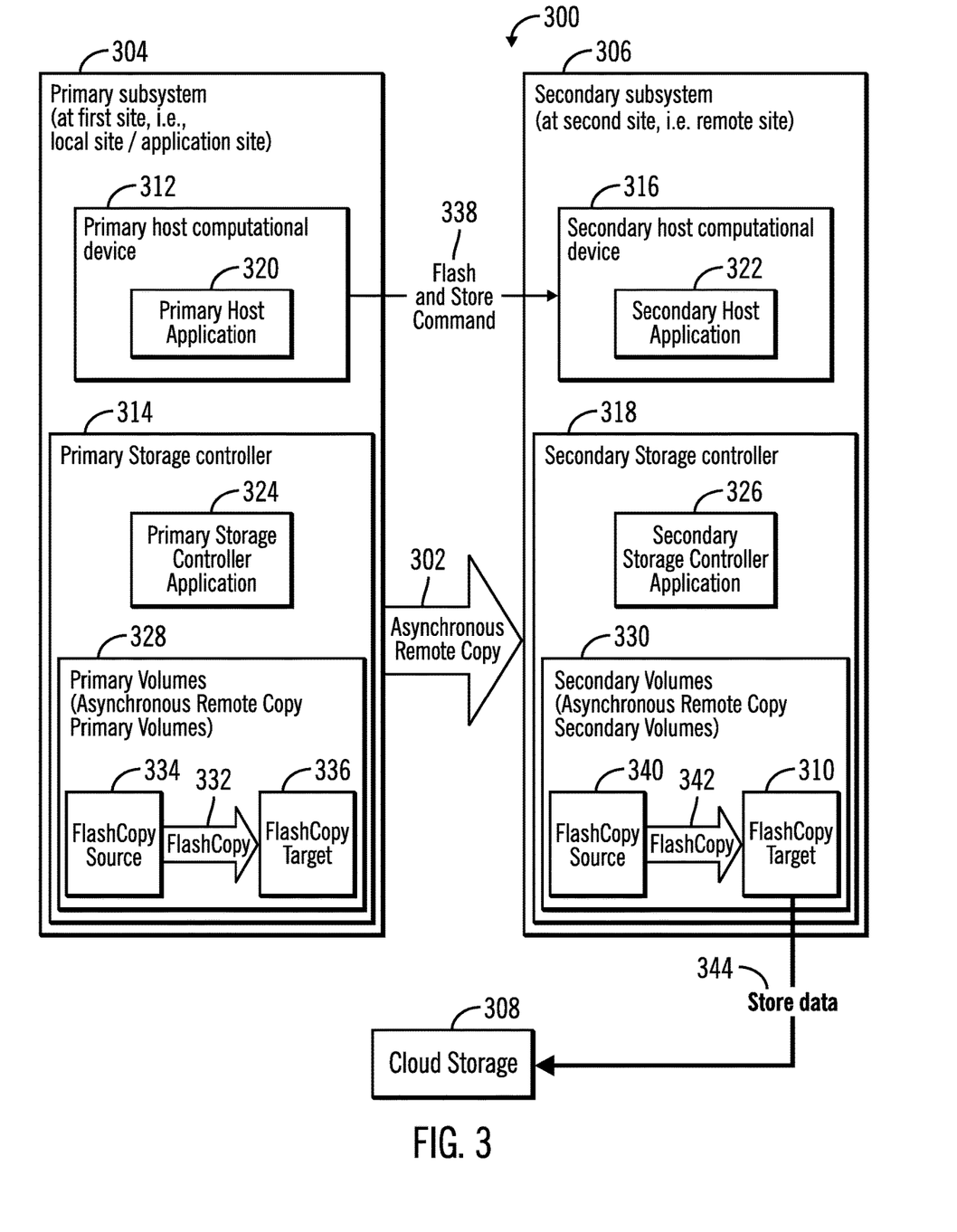
FIG. 3 illustrates a block diagram of a computing environment in which an asynchronous remote copy relationship is maintained between a primary subsystem and a secondary subsystem, and operations for storing of data in cloud storage is performed from a FlashCopy target in the secondary subsystem after mirroring of a FlashCopy command, in accordance with certain embodiments.

FIG. 3 illustrates a block diagram of a computing environment 300 in which an asynchronous remote copy relationship 302 is maintained between a primary subsystem 304 and a secondary subsystem 306, and operations for storing of data in cloud storage 308 is performed from a FlashCopy target 310 in the secondary subsystem 306 after mirroring of a FlashCopy command, in accordance with certain embodiments. The primary subsystem 304 is at a first geographical site which may be referred to as a local site or application site, and the secondary subsystem 306 is at a second geographical site which may be referred to as a remote site.

The primary subsystem 304 is comprised of a primary host computational device 312 and a primary storage controller 314. The secondary subsystem 306 is comprised of a secondary host computational device 316 and a secondary storage controller 318. The primary host computational device 312, the primary storage controller 314, the secondary host computational device 316 and the secondary storage controller 318 may each comprise any suitable computational device including those presently known in the art, such as, a personal computer, a workstation, a server, a mainframe, a hand held computer, a palm top computer, a telephony device, a network appliance, a blade computer, a processing device, etc. The primary host computational device 312, the primary storage controller 314, the secondary host computational device 316 and the secondary storage controller 318 may be elements in in any suitable network, such as, a storage area network, a wide area network, the Internet, an intranet, etc. In certain embodiments, the primary host computational device 312, the primary storage controller 314, the secondary host computational device 316 and the secondary storage controller 318, and the cloud storage 308 may be nodes in a cloud computing environment that comprises the computing environment 300.

A primary host application 320 executes in the primary host computational device 312, and a secondary host application 322 executes in the secondary host computational device 316. A primary storage controller application 324 executes in the primary host computational device 312, and a secondary storage controller application 326 executes in the secondary host computational device 316. In certain embodiments, the primary host application 320, the secondary host application 322, the primary storage controller application 324, and the secondary storage controller application 326 may be implemented in software, firmware, hardware or any combination thereof.

Primary volumes 328 of the primary storage controller 314 may be copied to the secondary volumes 330 of the secondary storage controller 318 via the asynchronous remote copy operations 302. The primary volumes 328 are also referred to as asynchronous remote copy primary volumes, and the secondary volume 330 are also referred to as asynchronous remote copy secondary volumes.

The primary host application 320 of the primary host computational device 312 generates a command to perform a FlashCopy 332 (i.e., a point in time copy command) of a source volume 334 to a target volume 336, where the source volume 334 is referred to as a FlashCopy source, and the target volume 336 is referred to as a FlashCopy target.

The primary host application 320 of the primary host computational device 312 sends a flash and store command 338 to the secondary host computational device 316 to store data in cloud storage. The flash and store command 338 comprises a Remote Pair FlashCopy* (RPFC) command. RPFC is a solution for mirroring the results of a point-in-time copy (FlashCopy) from the primary volumes to the secondary volumes in a remote mirror configuration, without disrupting the mirror or consistency at the remote site. RPFC captures the parameters of a FlashCopy and sends those parameters to the secondary volumes, replicating the operation.

As a result of the flash and store command 338, a FlashCopy source 340 and the FlashCopy target 310 of a FlashCopy 342 are generated in the secondary storage controller 318.

The secondary host application 322 of the secondary host computational device 316 processes the flash and store command 338 and based on the processing instructs the secondary storage controller 318 to store 344 (i.e., archive) data from the FlashCopy target 310 to the cloud storage 308.

The embodiments shown in FIG. 3 not only helps to reduce system resources at the primary subsystem 304 by offloading tasks for archiving to cloud storage to the secondary subsystem 306, they also prevent corruption of the archived data to the cloud storage if updates take place to the primary volumes 328 during the asynchronous remote copy 302, by archiving from the FlashCopy target 310 to the cloud storage 308.

Figure 4:
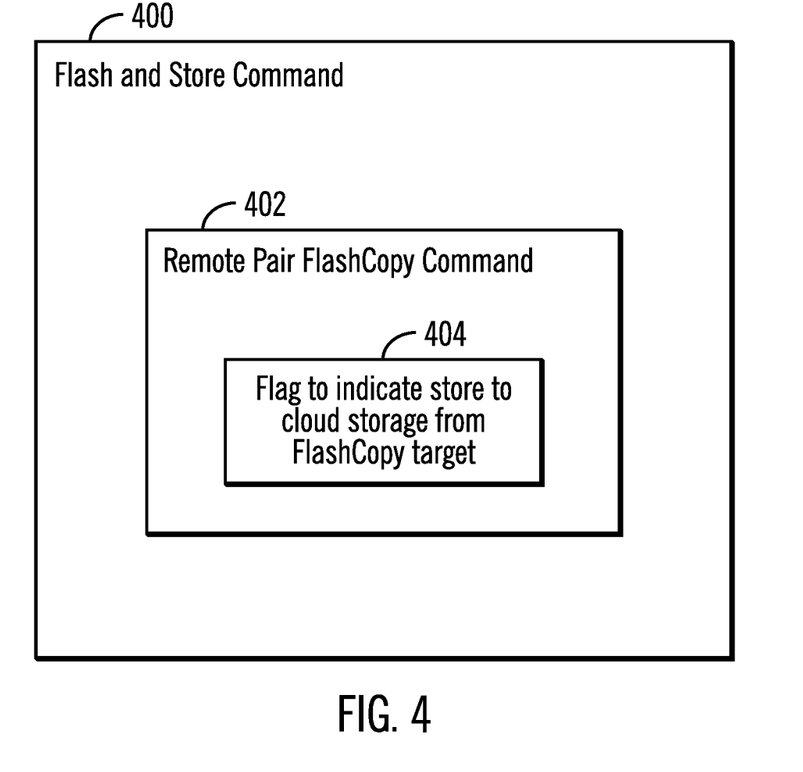
FIG. 4 illustrates a block diagram of a flash and store command, in accordance with certain embodiments.

FIG. 4 illustrates a block diagram of a flash and store command 400, in accordance with certain embodiments. The flash and store command 400 may comprise a remote pair FlashCopy command 402 with a flag 404 that indicates that archiving is to be performed to cloud storage from the FlashCopy target in the secondary storage controller 318.

Figure 5:
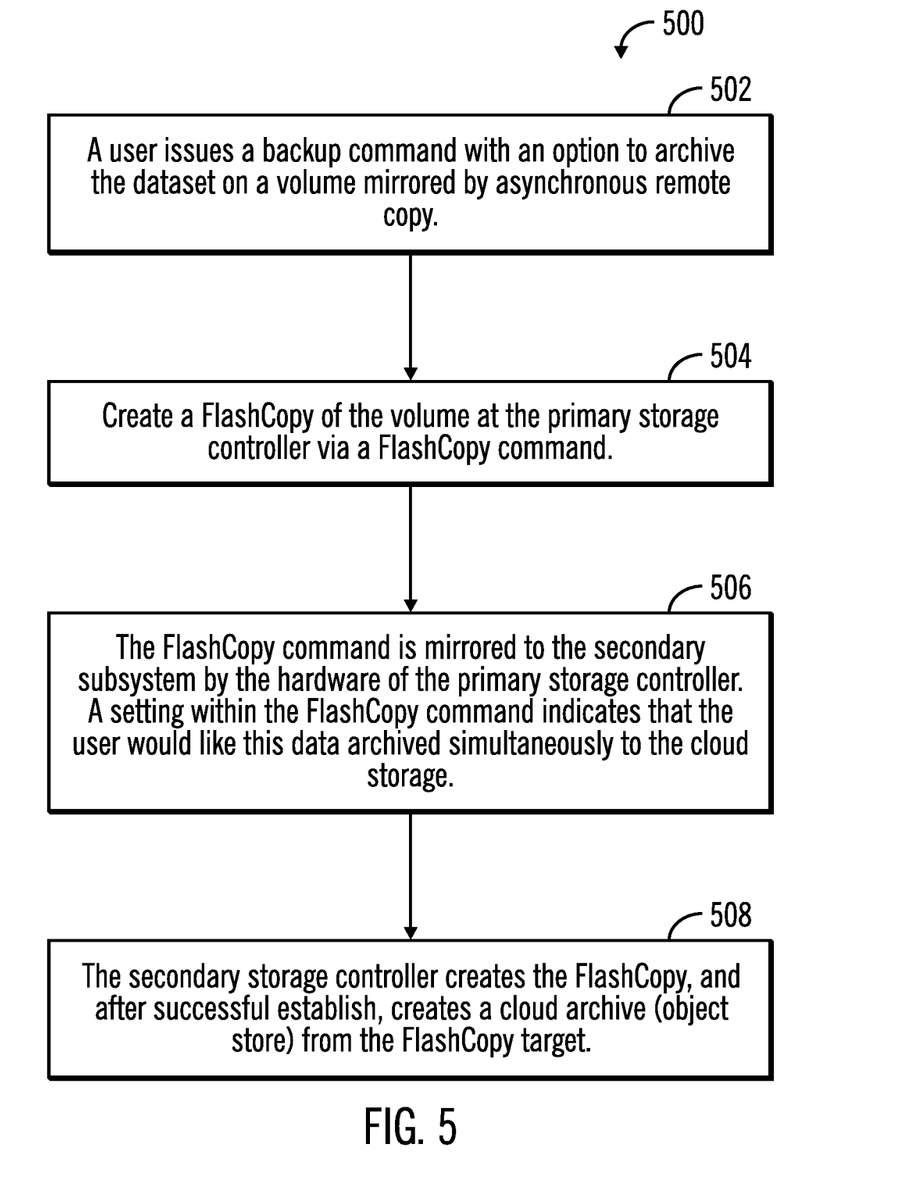
FIG. 5 illustrates a first flowchart for archival to cloud storage while performing remote backup of data, in accordance with certain embodiments.

FIG. 5 illustrates a first flowchart 500 for archival to cloud storage while performing remote backup of data, in accordance with certain embodiments. The operations shown in FIG. 5 may be performed at least by the applications 320, 322, 324, 326 that execute in the primary and secondary host computational devices 312, 316 and the primary and secondary storage controllers 314, 318.

Control starts at block 502 in which a user issues a backup command with an option to archive the dataset on a volume mirrored by asynchronous remote copy 302 in the computing environment 300. Control proceeds to block 504 in which the operations of block 502 lead to the creation of a FlashCopy of the volume at the primary storage controller 314 via a FlashCopy command.

The FlashCopy command is mirrored to the secondary subsystem by the hardware of the primary storage controller 314 (at block 506). A setting 404 within the FlashCopy command indicates that the user would like this data archived simultaneously to the cloud storage. The secondary storage controller 318 creates the FlashCopy, and, after successful establish, creates a cloud archive (object store) from the FlashCopy target (at block 508).

Since FlashCopy is point in time, and asynchronous remote copy mirrors are based on time consistency, the archive in the cloud storage 308 is protected from corruption. If a second backup is issued prior to completion of the first archive, the backup would fail at the remote site 306 with suspension of mirroring activity until the first requested archives are completed.

Figure 6:
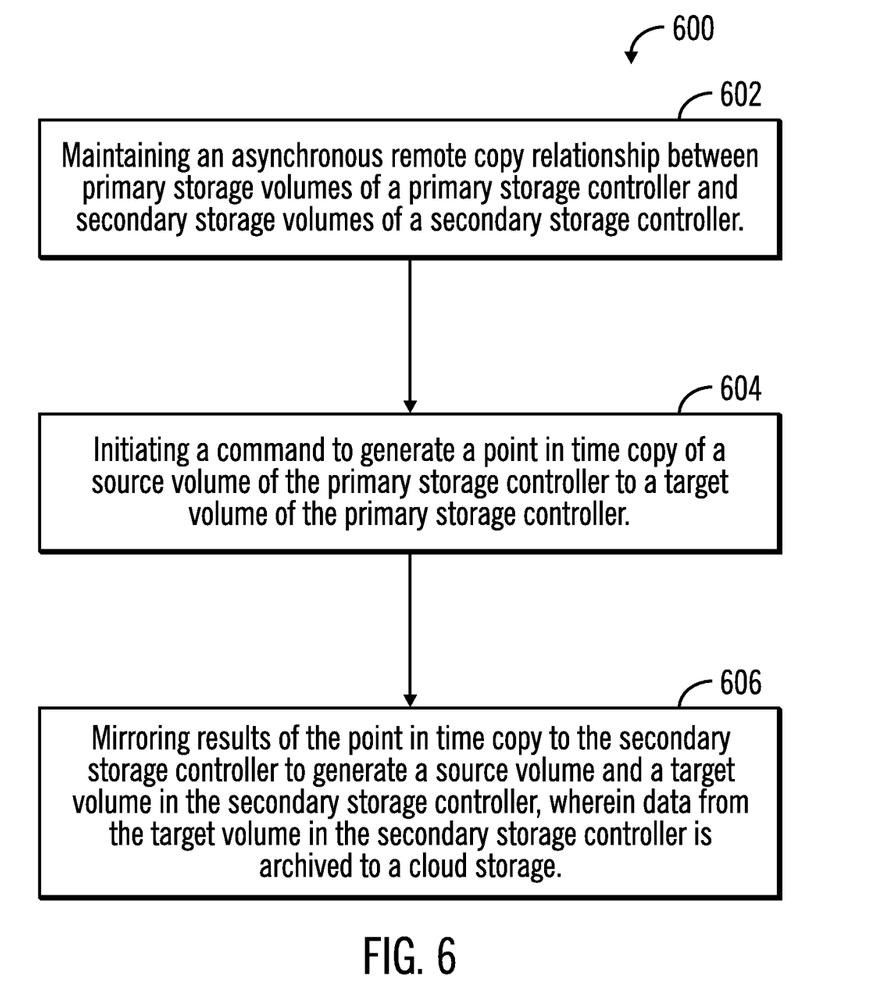
FIG. 6 illustrates a second flowchart for archival to cloud storage while performing remote backup of data, in accordance with certain embodiments.

FIG. 6 illustrates a second flowchart 600 for archival to cloud storage while performing remote backup of data, in accordance with certain embodiments. The operations shown in FIG. 6 may be performed at least by the applications 320, 322, 324, 326 that execute in the primary and secondary host computational devices 312, 316 and the primary and secondary storage controllers 314, 318.

Control starts at block 602 in which an asynchronous remote copy relationship is maintained between primary storage volumes 328 (i.e., primary volumes 328) of a primary storage controller 314 and secondary storage volumes 330 (i.e., secondary volumes 330) of a secondary storage controller 318. A command is initiated to generate a point in time copy of a source volume 334 of the primary storage controller 314 to a target volume 336 of the primary storage controller. 324 (at block 604).

From block 604 control proceeds to block 606 in which a mirroring is performed of results of the point in time copy to the secondary storage controller 318 to generate a source volume 340 and a target volume 310 in the secondary storage controller 318, and data from the target volume 310 in the secondary storage controller 318 is archived to a cloud storage.

Therefore, FIGS. 3-6 illustrate embodiments to archive data to cloud storage from a remote storage subsystem while maintaining data integrity and decreasing bandwidth usage at primary storage subsystem.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 7:
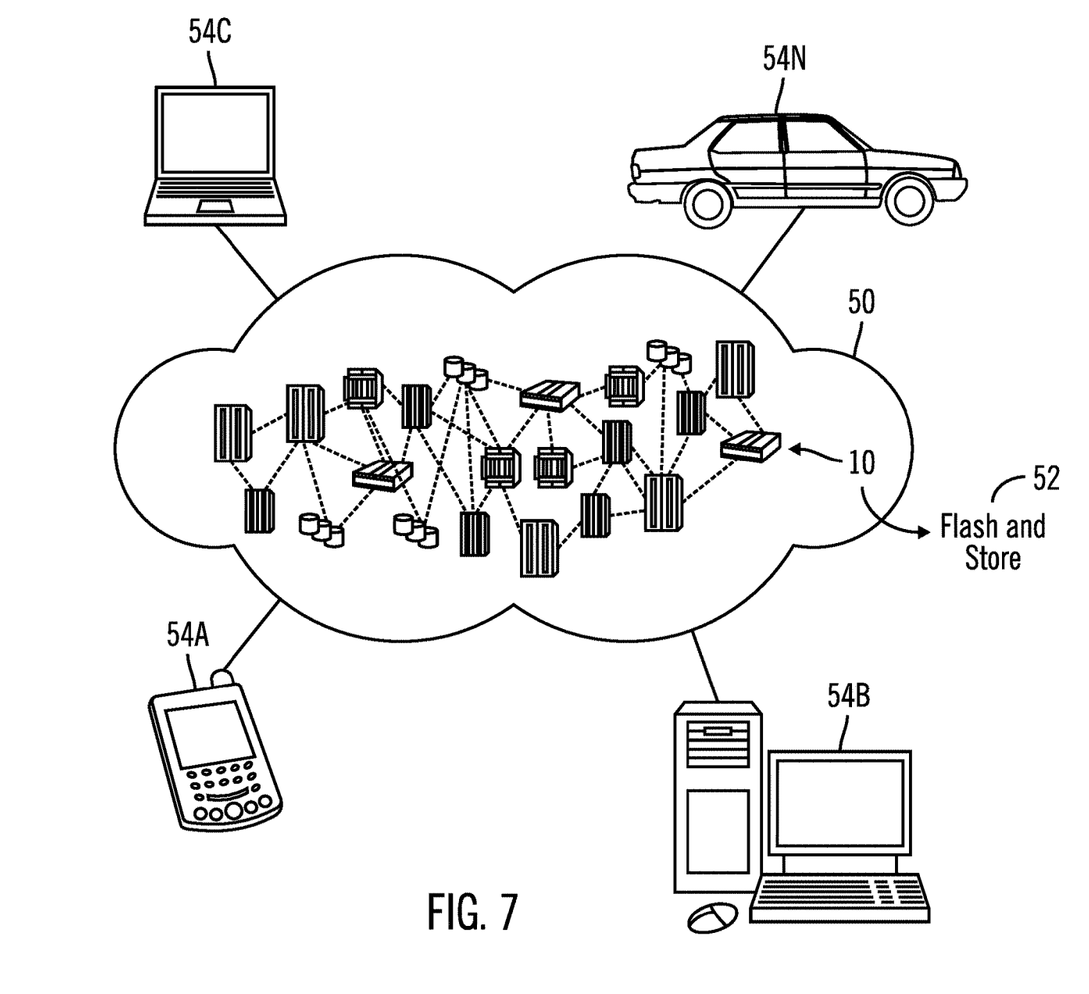
FIG. 7 illustrates a block diagram of a cloud computing environment, in accordance with certain embodiments.

Referring now to FIG. 7 an illustrative cloud computing environment 50 is depicted. Flash and store (shown via reference numeral 52) is performed in the cloud computing environment 50. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
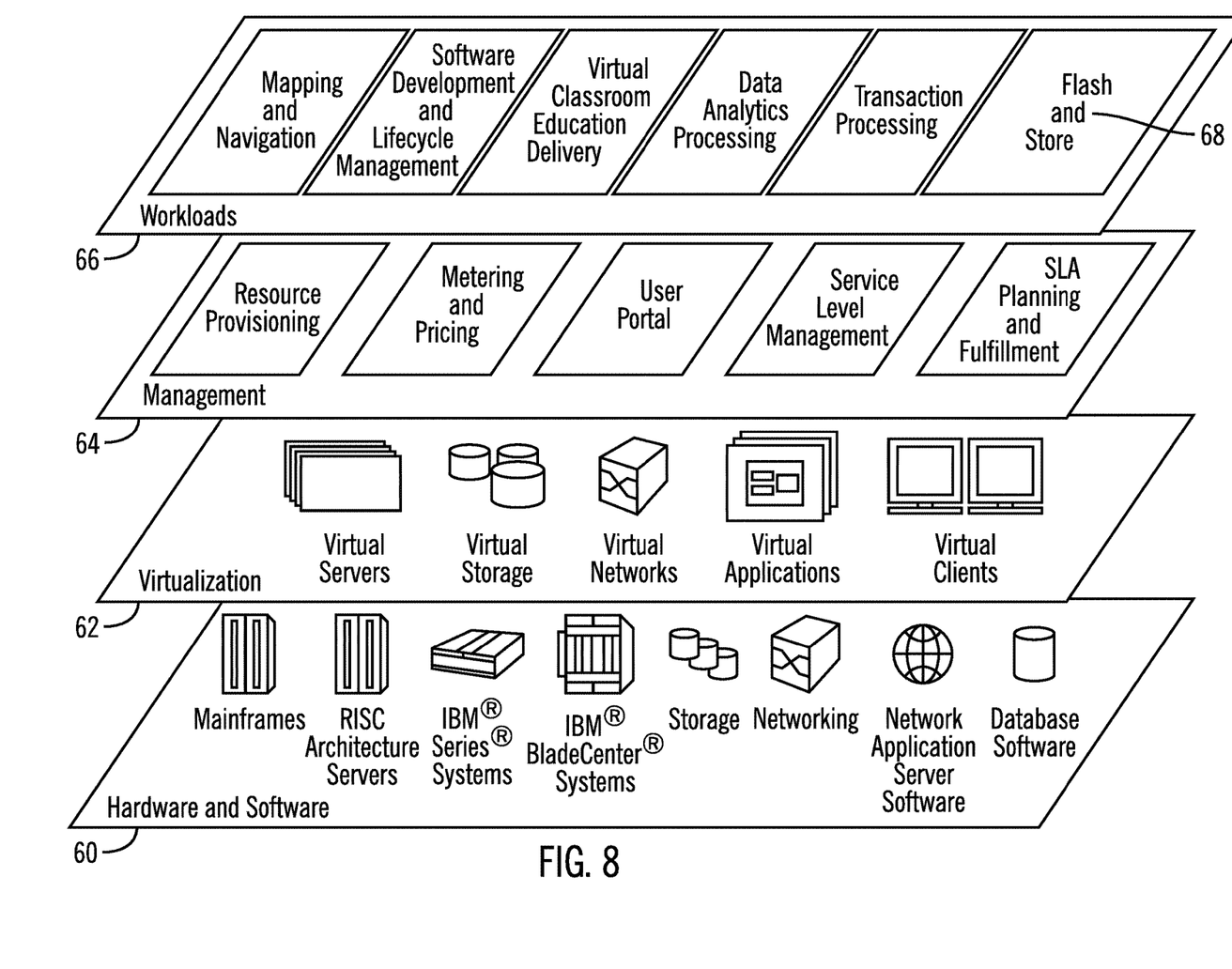
FIG. 8 illustrates a block diagram of further details of the cloud computing environment of FIG. 7, in accordance with certain embodiments.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto.

Hardware and software layer 60 includes hardware and software components. Examples of hardware components include mainframes, in one example IBM ZSERIES* systems; RISC (Reduced Instruction Set Computer) architecture based servers, in one example IBM PSERIES* systems; IBM XSERIES* systems; IBM BLADECENTER* systems; storage devices; networks and networking components. Examples of software components include network application server software, in one example IBM WEBSPHERE* application server software; and database software, in one example IBM DB2* database software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and flash and store 68 as shown in FIGS. 1-8.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 9:
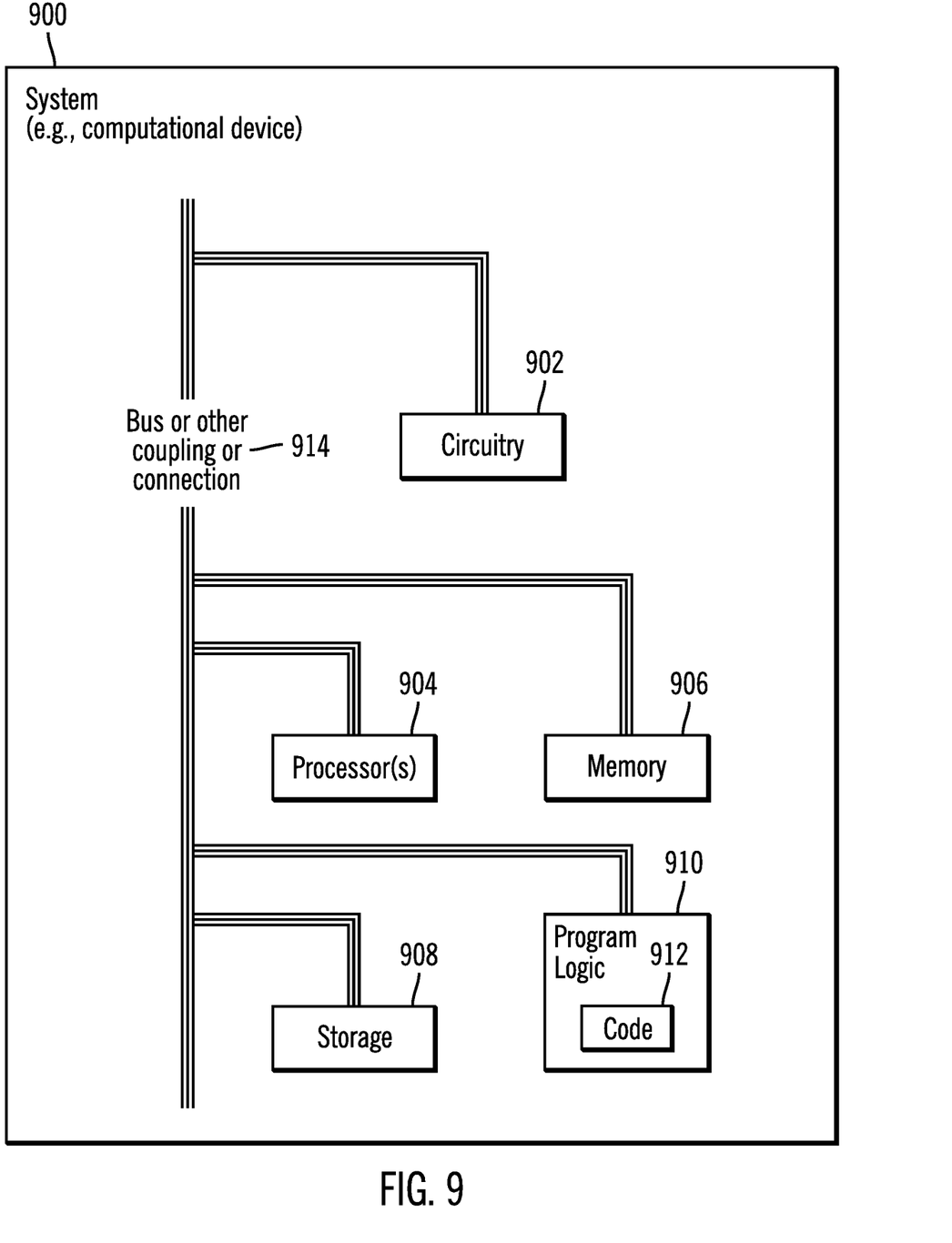
FIG. 9 illustrates a block diagram of a computational system that shows certain elements that may be included in the computing environments, as described in FIGS. 1-8, in accordance with certain embodiments.

FIG. 9 illustrates a block diagram that shows certain elements that may be included in the primary and secondary host computational devices 312, 316 and the primary and secondary storage controllers 314, 318, in accordance with certain embodiments. The system 900 may include a circuitry 902 that may in certain embodiments include at least a processor 904. The system 900 may also include a memory 906 (e.g., a volatile memory device), and storage 908. The storage 908 may include a non-volatile memory device (e.g., EEPROM, ROM, PROM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the processor 904 or circuitry 902. In certain embodiments, the program logic 910 including code 912 may be stored in the storage 908. In certain other embodiments, the program logic 910 may be implemented in the circuitry 902. One or more of the components in the system 900 may communicate via a bus or via other coupling or connection 914. While FIG. 9 shows the program logic 910 separately from the other elements, the program logic 910 may be implemented in the memory 906 and/or the circuitry 902.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article may be used in place of a single device/article. Similarly, where more than one device or article is described herein, it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

* IBM, ZSERIES, PSERIES, XSERIES, BLADECENTER, WEBSPHERE, DB2, FLASHCOPY, XRC, REMOTE PAIR FLASHCOPY are trademarks or registered trademarks of International Business Machines Corporation registered in many jurisdictions worldwide.

What is claimed is:

1. A method, comprising:
maintaining an asynchronous remote copy relationship between primary storage volumes of a primary storage controller and secondary storage volumes of a secondary storage controller;
initiating a command to generate a point in time copy of a source volume of the primary storage controller to a target volume of the primary storage controller; and
mirroring results of the point in time copy to the secondary storage controller to generate a source volume and a target volume in the secondary storage controller, wherein data from the target volume in the secondary storage controller is archived to a cloud storage, wherein the command to generate the point in time copy of the source volume of the primary storage controller to the target volume of the primary storage controller is generated by a primary host computational device coupled to the primary storage controller, and sent by the primary host computational device to the primary storage controller, wherein the mirroring of the results of the point in time copy to the secondary storage controller is initiated by the primary host computational device by sending a remote pair point in time copy command to a secondary host computational device, and wherein the remote pair point in time copy command includes a flag that indicates that archiving of data to the cloud storage is to be performed from the target volume in the secondary storage controller.

2. A method, comprising:
maintaining an asynchronous remote copy relationship between primary storage volumes of a primary storage controller and secondary storage volumes of a secondary storage controller;
initiating a command to generate a point in time copy of a source volume of the primary storage controller to a target volume of the primary storage controller; and
mirroring results of the point in time copy to the secondary storage controller to generate a source volume and a target volume in the secondary storage controller, wherein data from the target volume in the secondary storage controller is archived to a cloud storage, wherein the primary storage controller is coupled to a primary host computational device at a primary subsystem, and wherein the secondary storage controller is coupled to a secondary host computational device at a secondary subsystem, and wherein the primary host computational device continues to write additional data to the primary storage controller while storing the data from the target volume in the secondary storage controller to the cloud storage.

3. The method of claim 2, wherein the data is archived to the cloud storage from the secondary subsystem while maintaining data integrity at the primary subsystem.

4. The method of claim 3, wherein bandwidth usage decreases at the primary subsystem by offloading archiving of data to the cloud storage to the secondary subsystem.

5. A system, comprising:
a memory; and
a processor coupled to the memory, wherein the processor performs operations, the operations comprising:
maintaining an asynchronous remote copy relationship between primary storage volumes of a primary storage controller and secondary storage volumes of a secondary storage controller;
initiating a command to generate a point in time copy of a source volume of the primary storage controller to a target volume of the primary storage controller; and
mirroring results of the point in time copy to the secondary storage controller to generate a source volume and a target volume in the secondary storage controller, wherein data from the target volume in the secondary storage controller is archived to a cloud storage, wherein the command to generate the point in time copy of the source volume of the primary storage controller to the target volume of the primary storage controller is generated by a primary host computational device coupled to the primary storage controller, and sent by the primary host computational device to the primary storage controller, wherein the mirroring of the results of the point in time copy to the secondary storage controller is initiated by the primary host computational device by sending a remote pair point in time copy command to a secondary host computational device, and wherein the remote pair point in time copy command includes a flag that indicates that archiving of data to the cloud storage is to be performed from the target volume in the secondary storage controller.

6. A system, comprising:
a memory; and
a processor coupled to the memory, wherein the processor performs operations, the operations comprising:
maintaining an asynchronous remote copy relationship between primary storage volumes of a primary storage controller and secondary storage volumes of a secondary storage controller;
initiating a command to generate a point in time copy of a source volume of the primary storage controller to a target volume of the primary storage controller; and
mirroring results of the point in time copy to the secondary storage controller to generate a source volume and a target volume in the secondary storage controller, wherein data from the target volume in the secondary storage controller is archived to a cloud storage, wherein the primary storage controller is coupled to a primary host computational device at a primary subsystem, and wherein the secondary storage controller is coupled to a secondary host computational device at a secondary subsystem, and wherein the primary host computational device continues to write additional data to the primary storage controller while storing the data from the target volume in the secondary storage controller to the cloud storage.

7. The system of claim 6, wherein the data is archived to the cloud storage from the secondary subsystem while maintaining data integrity at the primary subsystem.

8. The system of claim 7, wherein bandwidth usage decreases at the primary subsystem by offloading archiving of data to the cloud storage to the secondary subsystem.

9. A computer program product, the computer program product comprising a computer readable storage medium having computer readable program code embodied therewith, the computer readable program code configured to perform operations, the operations comprising:
maintaining an asynchronous remote copy relationship between primary storage volumes of a primary storage controller and secondary storage volumes of a secondary storage controller;
initiating a command to generate a point in time copy of a source volume of the primary storage controller to a target volume of the primary storage controller; and
mirroring results of the point in time copy to the secondary storage controller to generate a source volume and a target volume in the secondary storage controller, wherein data from the target volume in the secondary storage controller is archived to a cloud storage, wherein the command to generate the point in time copy of the source volume of the primary storage controller to the target volume of the primary storage controller is generated by a primary host computational device coupled to the primary storage controller, and sent by the primary host computational device to the primary storage controller, wherein the mirroring of the results of the point in time copy to the secondary storage controller is initiated by the primary host computational device by sending a remote pair point in time copy command to a secondary host computational device, and wherein the remote pair point in time copy command includes a flag that indicates that archiving of data to the cloud storage is to be performed from the target volume in the secondary storage controller.

10. A computer program product, the computer program product comprising a computer readable storage medium having computer readable program code embodied therewith, the computer readable program code configured to perform operations, the operations comprising:
maintaining an asynchronous remote copy relationship between primary storage volumes of a primary storage controller and secondary storage volumes of a secondary storage controller;
initiating a command to generate a point in time copy of a source volume of the primary storage controller to a target volume of the primary storage controller; and
mirroring results of the point in time copy to the secondary storage controller to generate a source volume and a target volume in the secondary storage controller, wherein data from the target volume in the secondary storage controller is archived to a cloud storage, wherein the primary storage controller is coupled to a primary host computational device at a primary subsystem, and wherein the secondary storage controller is coupled to a secondary host computational device at a secondary subsystem, and wherein the primary host computational device continues to write additional data to the primary storage controller while storing the data from the target volume in the secondary storage controller to the cloud storage.

11. The computer program product of claim 10, wherein the data is archived to the cloud storage from the secondary subsystem while maintaining data integrity at the primary subsystem.

12. The computer program product of claim 11, wherein bandwidth usage decreases at the primary subsystem by offloading archiving of data to the cloud storage to the secondary subsystem.

\* \* \* \* \*